(12) United States Patent
Black

(10) Patent No.: US 7,499,408 B1
(45) Date of Patent: Mar. 3, 2009

(54) METHOD AND SYSTEM FOR ESTABLISHING A COMMUNICATIONS CONNECTION

(75) Inventor: Robert B. Black, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 893 days.

(21) Appl. No.: 10/807,786

(22) Filed: Mar. 23, 2004

(51) Int. Cl.
*H04L 12/28* (2006.01)

(52) U.S. Cl. .................. 370/252; 370/437; 370/465

(58) Field of Classification Search .......... 370/252, 370/437, 465
See application file for complete search history.

(56) References Cited

U.S. PATENT DOCUMENTS

| | | | |
|---|---|---|---|
| 6,751,315 B1 | 6/2004 | Liu et al. | |
| 6,775,268 B1 | 8/2004 | Wang et al. | |
| 6,778,505 B1 * | 8/2004 | Bullman et al. | 370/254 |
| 6,829,294 B2 * | 12/2004 | Sweitzer et al. | 375/225 |
| 6,870,899 B2 | 3/2005 | Lu et al. | |
| 6,873,623 B2 | 3/2005 | Weirich | |
| 6,967,996 B1 * | 11/2005 | Cai et al. | 375/222 |
| 6,975,597 B1 | 12/2005 | Baker | |
| 6,978,011 B1 | 12/2005 | Bailey | |
| 7,006,452 B2 * | 2/2006 | Lund | 370/254 |
| 7,012,899 B1 * | 3/2006 | Hagler et al. | 370/252 |
| 7,035,249 B2 * | 4/2006 | Christensen et al. | 370/352 |
| 7,093,289 B2 * | 8/2006 | McElroy et al. | 726/13 |
| 7,142,590 B2 | 11/2006 | Kelliher | |
| 7,142,591 B2 | 11/2006 | Kelliher | |
| 7,242,761 B1 | 7/2007 | Milbrandt | |
| 7,266,109 B1 | 9/2007 | Rosenstern et al. | |

* cited by examiner

*Primary Examiner*—Jason E Mattis
(74) *Attorney, Agent, or Firm*—Baker Botts L.L.P.

(57) ABSTRACT

According to one embodiment of the invention, a method for establishing a communications connection is provided. The method includes transmitting, by a digital subscriber line access multiplexer to a communications device, a plurality of parameters each representing a different indication of a same feature of the digital subscriber line access multiplexer. Each parameter is correlated with one or more communications settings. The method also includes establishing a plurality of digital subscriber line connections with the communications device. Each connection corresponds with a particular one of the parameters. The method also includes selecting one of the connections as meeting a predetermined criteria. The method also includes identifying one of the parameters that corresponds to the selected connection. The method also includes establishing a digital subscriber line connection with the communications device using at least one communications setting correlated with the identified parameter.

30 Claims, 3 Drawing Sheets

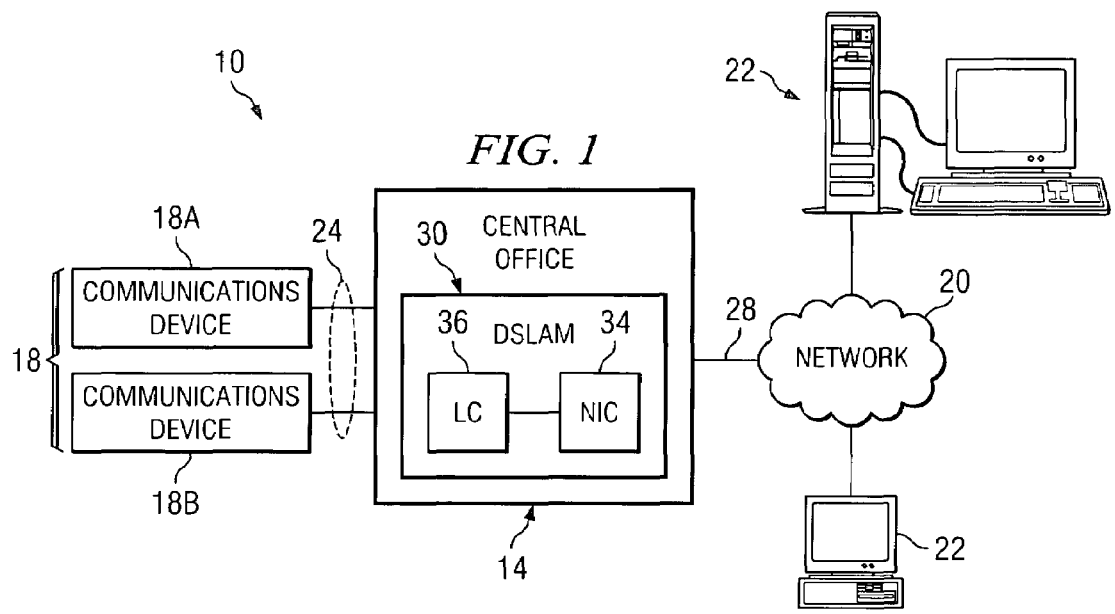
FIG. 1
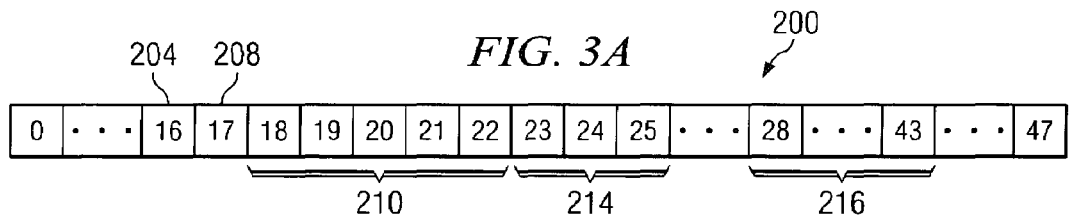
FIG. 3A
FIG. 3B
| VENDOR ID | T1.413 REVISION NUMBER | VENDOR REVISION NUMBER | ... |
|---|---|---|---|
| 0000000000000001 | 001 | 00001 | ... |
| 0000000000000011 | 000 | 00010 | ... |
| 0000000000000010 | 010 | 00011 | ... |
| ⋮ | ⋮ | ⋮ | |

METHOD AND SYSTEM FOR ESTABLISHING A COMMUNICATIONS CONNECTION

TECHNICAL FIELD OF THE INVENTION

This invention relates generally to communications and more particularly to a method and system for establishing a communications connection.

BACKGROUND OF THE INVENTION

Digital subscriber line ("DSL") technology is often employed in today's society to access the internet or other networks. In response to a growing popularity of DSL, many different communications equipment manufacturers are entering the DSL equipment market. As the number of such manufacturers increases, the diversity of DSL equipment also increases. Thus, interoperability between the numerous types of DSL equipment may become a challenge.

Working through the interoperability challenge is an expensive and time consuming process for a manufacturer of a digital subscriber line access multiplexer ("DSLAM"), which functions as a bridge between customer-side DSL equipment and the network. For every new type of customer-side DSL equipment that enters the market, the DSLAM manufacturer may need to update each DSLAM with a new set of communications settings in order to provide an optimal connection with the new customer-side DSL equipment. The problem of interoperability may become more complicated when some customer-side DSL equipment manufacturers attempt to cut their production costs by sacrificing interoperability. For example, if a DSL device is manufactured by manufacturer "A" who decides to cut production costs by skipping the process of determining the communications settings applicable to its DSL devices, manufacturer "A" may design its DSL devices to either identify themselves during the train-up process with a DSLAM as having been manufactured by manufacturer "B" that manufactures DSL products with communications settings known to DSLAMs. Manufacturer "A" may also design its devices so that during the train-up process, the devices merely repeat back the manufacturer identification provided by the DSLAM. These cost-saving tactics may result in connections having poor quality or failed connections, which may be detrimental to consumers.

SUMMARY OF THE INVENTION

According to one embodiment of the invention, a method for establishing a communications connection is provided. The method includes transmitting, by a digital subscriber line access multiplexer to a communications device, a plurality of parameters each representing a different indication of a same feature of the digital subscriber line access multiplexer. Each parameter is correlated with one or more communications settings. The method also includes establishing a plurality of digital subscriber line connections with the communications device. Each connection corresponds with a particular one of the parameters. The method also includes selecting one of the connections as meeting a predetermined criteria. The method also includes identifying one of the parameters that corresponds to the selected connection. The method also includes establishing a digital subscriber line connection with the communications device using at least one communications setting correlated with the identified parameter.

Some embodiments of the invention provide numerous technical advantages. Other embodiments may utilize some, none, or all of these advantages. For example, according to one embodiment, interoperability is enhanced between communications devices by cycling through different parameters to determine that a parameter or set of parameters results in an optimal communications connection. According to another embodiment, the production cost of a digital subscriber line access multiplexer is reduced. According to another embodiment, the quality of communications connections is improved.

Other advantages may be readily ascertainable by those skilled in the art.

BRIEF DESCRIPTION OF THE DRAWINGS

Reference is now made to the following description taken in conjunction with the accompanying drawings, wherein like reference numbers represent like parts, in which:

FIG. 1 is a schematic diagram illustrating one embodiment of a digital subscriber line communications system;

FIG. 3A is a schematic diagram illustrating one embodiment of a C-MSGS1 message shown in FIG. 2;

FIG. 3B is a schematic diagram illustrating one embodiment of a database shown in FIG. 2.

DETAILED DESCRIPTION OF EXAMPLE EMBODIMENTS OF THE INVENTION

Figure 2:
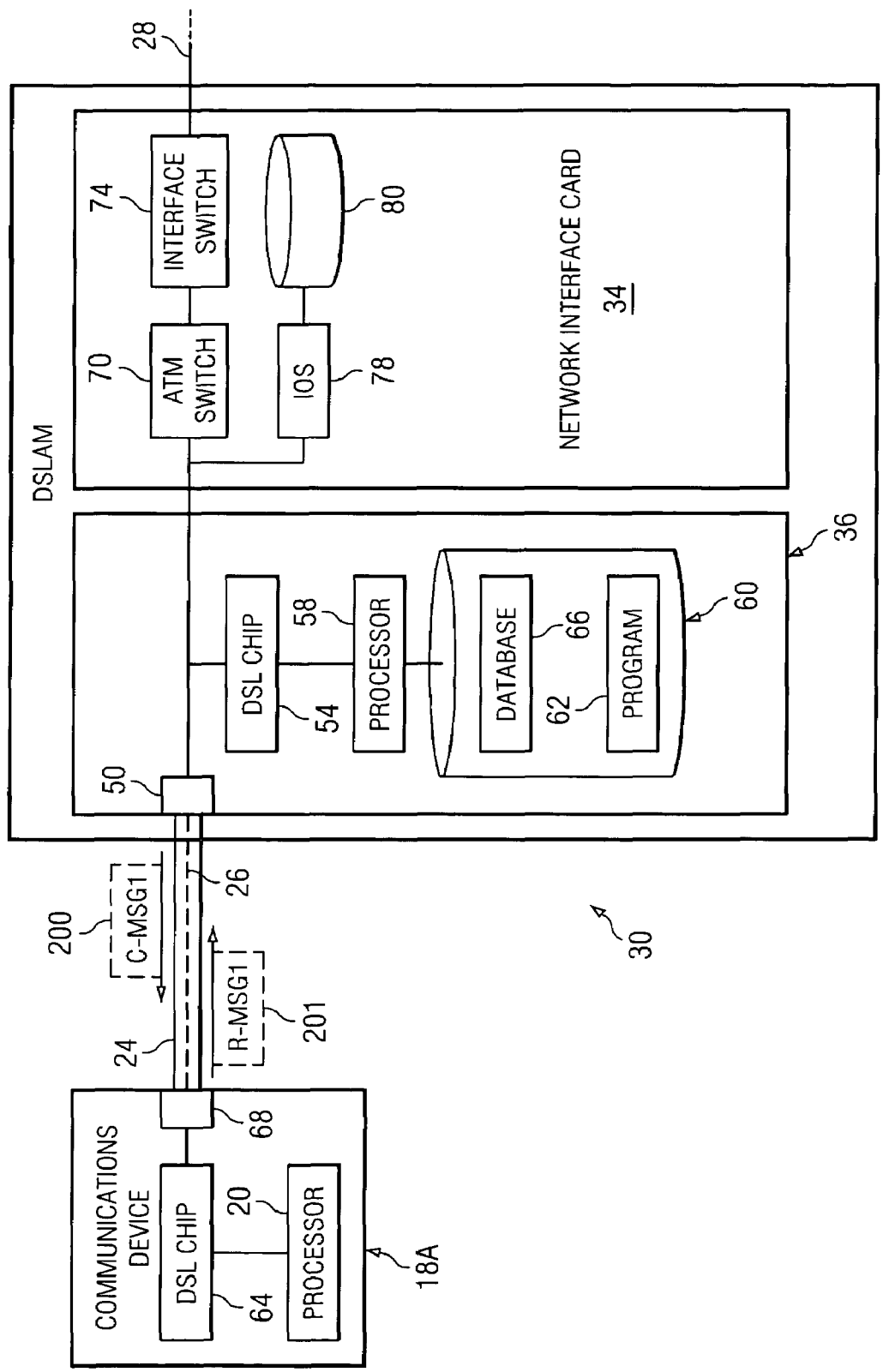
FIG. 2 is a schematic diagram illustrating one embodiment of a digital subscriber line access multiplexer shown in FIG. 1.

Embodiments of the invention are best understood by referring to FIGS. 1 through 4 of the drawings, like numerals being used for like and corresponding parts of the various drawings.

FIG. 1 is a schematic diagram of a communication system 10 that may benefit from the teachings of the present invention. System 10 includes a central office 14, one or more communication devices 18A and 18B (jointly referred to as communications devices 18), a network 20, such as an internet protocol network, and a plurality of communications devices 22. Devices 18 are coupled to central office 14 by physical lines 24, such as telephone lines. Central office 14 is coupled to network 20 by a trunk line 28. Trunk line 28 may be any suitable communications link that may carry internet protocol traffic, including OC3, DS3, and T1 (STM1, E3, E1, in Europe). Network 20 is coupled to communication devices 22, such as a server 22 having web site content. Network 20 and central office 14 allow communication between devices 18 and 22.

Central office 14 comprises, among other components not explicitly shown, a digital subscriber line access multiplexer ("DSLAM") 30. DSLAM 30 allows communication between communications devices 18 and devices 22 coupled to network 20 using digital line subscriber ("DSL") technology, which may offer a faster connection speed than a traditional dial-up connection. DSLAM 30 comprises, in this example, a network interface card 34 and a line card 36. Although FIG. 1 shows one line card 36, more line cards may be utilized to accommodate more communication devices 18. Although FIG. 1 shows one communications device 18 coupled to central office 14 over one line 24, multiple communications devices 18 may be coupled to central office 14 over one or more physical lines 24. As shown in FIG. 1, line card 36 is coupled to network interface card 34. Communications device 18 may be any device, such as a computer, that is operable to establish a communications connection with central office 14. In one embodiment, device 18 is operable to establish a DSL connection with DSLAM 30.

In operation, network interface card 34 communicates with devices 22 coupled to network 20 over trunk line 28. Network interface card 34 receives data from network 20 over trunk line 28 and communicates the received data to an appropriate line card 36 that is associated with the intended destination of the data. An example of such a destination is device 18A. Conversely, network interface card 34 receives data from line card 36 and communicates the received data over trunk line 28 to network 20. Network interface card 34 also contains ethernet switch fabric or ATM switch fabric (shown and described in conjunction with FIG. 2) that manages and processes incoming data. Network interface card 34 manages all aspects of DSLAM 30, including system help, system performance, switch help and performance, and network communications.

Line card 36 receives data from communications devices 18 over telephone line 24 and communicates the received data to network interface card 34 for eventual transmission to device 22 through network 20. Conversely, line card 36 receives data through network 20 and network interface card 34 from device 22 and communicates the received data to an appropriate communications device 18 over line 24. Each line 24 provides a physical medium in which DSLAM 30 and one or more communications devices 18 may form respective DSL connections for communicating data.

For DSLAM 30 and communications devices 18 to communicate using DSL technology, DSLAM 30 and communication devices 18 may be required to be manufactured according to a particular industry standard, such as the one adopted by American National Standards Institute ("ANSI"). For example, DSL-capable devices are manufactured pursuant to a version of a standard referred to as ANSI T1.413. However, although this standard is available, manufacturers may manufacture DSL devices 18 that have certain unique characteristics that are not addressed by the standard or contrary to the guidelines of the standard. Further, manufacturers may use different versions of ANSI T1.413 to manufacture their devices 18, which may increase the variance between available DSL communications devices 18. To enhance interoperability between a variety of communications devices 18 and DSLAM 30, manufacturers of communications devices 18 may provide a manufacturer of DSLAM 30 with communications settings that may be used in conjunction with their particular type of communications device 18 to establish an optimal DSL connection. In turn, a DSLAM manufacturer may program DSLAM 30 so that the particular set of settings provided by manufacturers of devices 18 may be triggered into use based on one or more parameters received from the particular communications device 18. For example, manufacturer "A" of communications device 18A may provide settings "x" and "y" to be available in DSLAM 30. "x" may be bit swapping, and "y" may be trellis encoding. However, other settings may also be provided.

Upon receiving a parameter indicating that communications device 18A is manufactured by manufacturer "A", DSLAM 30 is operable to adjust its communications settings to "x, y, and z" so that an optimal connection may be established between communications device 18A and DSLAM 30. However, because new manufacturers of DSL equipment continually enter the equipment market, it is costly and time consuming for a DSLAM manufacturer to continually update the available communications settings in DSLAM 30.

Further, some manufacturers of communications devices 18 may attempt to cut the production costs by sacrificing interoperability with DSLAM 30. For example, manufacturer "A" of communications device 18A may decide to cut production costs by skipping the process of determining the communication settings applicable to its device 18A. Instead, manufacturer "A" may design its device 18A to identify itself during the train-up process with DSLAM 30 as being made by another manufacturer that has products with communication settings known to DSLAM 30. It is also possible for the device 18A to merely mirror the manufacturer identification provided by DSLAM 30. For example, if manufacturer "A" knows that manufacturer "B" has provided settings to DSLAM manufacturer of DSLAM 30, then manufacturer "A" may design communications device 18A to identify itself as a device manufactured by manufacturer "B". In another example, if DSLAM 30 indicates that the manufacturer of DSLAM 30 is "C" during the train-up process, then communications device 18A may identify itself also as having been manufactured by manufacturer "C," thus mirroring the input from DSLAM 30. While these tactics may work from time to time to establish acceptable DSL connections, the probability of poor quality or failed DSL connections increases because DSLAM 30 does not have pre-determined settings to establish an optimal DSL connection.

According to one embodiment of the present invention, a method and system are provided for improving interoperability of communications equipment by enabling DSLAM 30 to cycle through a variety of parameters and select a parameter or a parameter set that results in an optimal connection with communications device 18. In one embodiment, the production cost of a DSLAM is reduced. In one embodiment, the quality of communications connections, such as a DSL connection, is improved. Some embodiments of the invention may utilize some, none, or all of these advantages.

FIG. 2 is a schematic diagram illustrating additional details of one embodiment of DSLAM 30 shown in FIG. 1. In one embodiment, DSLAM 30 comprises line card 36 coupled to network interface card 34. Network interface card 34 comprises an ATM switch 70, an interface switch 74, an internetwork operating system ("IOS") 78, and a memory 80. ATM switch 70 is coupled to line card 36, IOS 78, and interface switch 74. IOS 78 is coupled to memory 80. Interface switch 74 is coupled to trunk line 28.

ATM switch 70 of network interface card 34 is operable to receive ATM cells transmitted by communications device 18A through line card 36 and to assemble the ATM cells. ATM switch 70 is also operable to send the assembled ATM cells to interface switch 74. Interface switch 74 is operable to convert the received assembly of ATM cells into a suitable format for transmission to network 20. For example, the assembled set of ATM cells may be converted into ethernet packets for transmission to network 20. Interface switch 74 is also operable to receive data from network 20 and process the data into a format suitable for transmission to ATM switch 70. ATM switch 70 is operable to receive the processed data from interface switch 74 and segment the data into ATM cells for transmission to communications device 18A through line card 36. IOS 78 is operable to store information regarding communications settings that are associated with various parameters that may be exchanged between DSLAM 30 and communications device 18A prior to establishing DSL connection 26. Additional details concerning IOS 78 are described below.

In one embodiment, line card 36 comprises a port 50, a DSL chip 54, a processor 58, and a memory 60 storing a program 62 and a database 66. Processor 58 is coupled to DSL chip 54 and memory 60. DSL chip 54 is coupled to port 50. Port 50 is coupled to line 24 and used to establish a DSL connection 26 with customer device 18A. Communications device 18A comprises a processor 20, a DSL chip 64, and a port 68. DSL chip 64 is coupled to processor 20 and port 68. Port 68 is used to establish DSL connection 26 with DSLAM 30 over line 24.

DSL chip 54 may be one or more integrated circuit chips or chip sets. DSL chip 54 is operable to establish DSL connection 26 with communications device 18A. To that end, DSL chip 54 is operable to conduct train-up with device 18A and channel analysis of DSL connection 26. "Training," or "train-up," refers to a process where DSLAM 30 transmits certain parameters associated with DSL chip 54 and receives certain parameters associated with a DSL chip of another communications device with which chip 54 is attempting to establish a connection, such as DSL chip 64 of device 18A. This exchange of parameters is referred to as a "negotiation" between device 18A and DSLAM 30. Analogous negotiations may be performed between DSLAM 30 and other devices 18. In one embodiment, train-up is initiated when communications device 18A transmits an R-REVERB1 message to DSLAM 30, which contains information that allows DSLAM 30 to measure the upstream wide band power to adjust the transmit power level of DSLAM 30. An R-REVERB1 also allows DSLAM 30 to adjust its receiver gain control and synchronize its receiver and train its equalizer (not explicitly shown in FIG. 2). As a part of the train-up process, DSLAM 30 also transmits a C-REVERB1 message to device 18A pursuant to ANSI T1.413, which allows device 18A to adjust its automatic gain control to an appropriate level.

DSL chip 64 may be one or more integrated circuit chips or chip sets. DSL chip 64 is operable to establish DSL connection 26 with DSLAM 30. To that end, DSL chip 64 is operable to conduct train-up with DSLAM 30. DSL chip 64 is operable to transmits a R-REVERB1 message to DSLAM 30. DSL chip 64 is also operable to receive a C-REVERB1 message from device 18A pursuant to ANSI T1.413, and to adjust device's 18A automatic gain control to an appropriate level.

As a part of the channel analysis process, DSL chips 54 and 64 are operable to exchange their respective parameters so that an optimal DSL connection 26 may be established. Examples of such parameters include a manufacturer (also referred to as "vendor") identification of a DSL chip transmitting the parameter, ANSI T1.413 revision number pursuant to which the transmitting chip was manufactured, vendor revision number identifying the particular model of the transmitting chip, and transmit power level used by the transmitting entity, such as DSLAM 30. Pursuant to ANSI T1.413, DSL chip 54 of DSLAM 30 is operable to transmit a C-MSGS1 200, as shown in FIG. 2, that includes these and other parameters describing chip 54 and DSLAM 30. Conversely, pursuant to ANSI T1.413, DSL chip 64 of device 18A is operable to transmit an R-MSGS1 201 that includes these and other parameters describing chip 64 and device 18A.

Processor 58 is an integrated circuit chip that is operable to execute program 62 stored in memory 60. Processor 58 is also operable to control the operations of DSL chip 54 and access database 62 pursuant to the instructions of program 62.

Program 62 may be executed using processor 58. According to one embodiment of the invention, program 62 is operable to instruct DSL chip 54 to cycle through a series of parameters in one or more parameter categories and assess a connection quality of the resulting DSL connection for each different parameter. From the various parameters used, program 62 is operable to select a parameter or a set of parameters that results in an optimal quality of connection between device 18A and DSLAM 30, and direct chip 54 to use the settings associated with the selected parameter or parameter set to establish connection 26. An optimal connection may include one or more connection characteristics, and additional details describing what constitutes an optimal connection are provided later in this description.

The parameters cycled through by program 62 may or may not indicate the true characteristics of DSL chip 54 and/or DSLAM 30. For example, although DSL chip 54 was made by manufacturer "A," DSL chip 54 may cycle through identities of other manufacturers. In one embodiment, program 62 is operable to cycle through different parameters or parameter sets by directing DSL chip 54 to perform multiple train-up sessions with device 18A. For each train-up session, a C-MSGS1 message 200 transmitted to device 18A includes at least one different parameter than a previous C-MSGS1 message of a previous train-up session. After sending each C-MSGS1 message 200 to device 18A, program 62 may direct DSL chip 54 to use communication settings associated with the particular parameters in the C-MSGS1 message 200 and/or R-MSGS1 message 201 received in response to transmitting C-MSG1 message 200 to establish a connection. For example, where one of the parameters sent to device 18A indicates a manufacturer of DSL chips, communication settings associated with that parameter may include the following: A first setting indicating that a DSLAM having the particular DSL chips may limit the number of bins used in a training session or particular bins where known issues arise. A second setting indicating the use of trellis encoding A third setting indicating the use of overhead framing modes. A fourth setting indicating various applicable power levels. Other settings may be associated with the parameter indicating a manufacturer of DSL chips.

Parameter categories each containing at least one parameter that may be cycled through by program 62 are stored in database 66. Program 62 is also operable to communicate with IOS 78 for storing one or more parameters that are selected as resulting in an optimal DSL connection 26. In response, IOS 78 is operable to store the parameters and/or parameter sets identified by program 62 in memory 80. This is advantageous in some embodiments because any future communications with device 18A or devices 18 similar to device 18A may be established using the correlated parameters stored in memory 80. This may allow program 62 to avoid the process of connection optimization with device 18A. In one embodiment, program 62 may be operable to detect that a customer is using a new communications device 18 that is different from a previously-used device 18. The detection may be made, in one embodiment, through the use of a vendor identification and/or a product identification. In response to such a detection, program 62 may be operable to conduct the connection optimization procedure for the new communications device 18.

In one embodiment, program 62 is operable to conduct a safe train-up procedure if an initial train-up attempt by DSL chip 54 fails. In such a case, program 62 may direct DSL chip 54 to use a limited number of parameters that are necessary to train-up with device 18A. Program 62 may also direct DSL chip 54 to use generic parameters. In turn, the communications settings that are associated with the transmitted parameters are implemented at DSLAM 30. For example, a set of parameters that may be used for safe train-up process may include some or all of the following: A first parameter indicating that bit-swapping is disabled, a second parameter indicating that trellis coding is disabled, a third parameter indicating that full power mode is used (e.g. no power management is conducted), and/or a fourth parameter indicating that overhead framing mode three is supported.

While program 62 is described as a software program in one embodiment, program 62 may be implemented using any suitable methods. For example, a part or all of program 62 may be implemented using DSL chip 54. In a software version, program 62 may be implemented using any suitable computer language, including C+ or C++. An example operation of line card 36 is described below in conjunction with FIG. 4.

FIG. 3A is a schematic diagram illustrating one embodiment of C-MSGS1 message 200 shown in FIG. 2. Message 200 is a 48-bit message, as shown in FIG. 3A. Pursuant to ANSI T1.413 standard, the following bits are used for the following category of parameters. A bit 204 is reserved for echo cancellation. An entry of "0" indicates no echo cancellation is implemented by DSLAM 30, and an entry of "1" indicates that echo cancellation is implemented by DSLAM 30. A bit 208 is reserved for trellis coding option. An entry of "0" indicates that DSLAM 30 has no trellis coding capability, and an entry of "1" indicates DSLAM has trellis coding capability. Trellis coding refers to a method for performing forward error correction, which may decrease communications speed. A bit block 210 is a five-bit block reserved for indicating a particular model of DSL chip 54 that is manufactured by the vendor of DSL chip 54. A bit block 214 is a three-bit block reserved for indicating a particular revision number of ANSI T1.413 standard that was used as a guideline for manufacturing DSL chip 54. A bit block 216 is a 16-bit block reserved for indicating a particular manufacturer of DSL chip 54. All parameters entered in message 200 may in binary form.

FIG. 3B is a schematic diagram illustrating one embodiment of database 66 that may be stored in memory 60. Database 66 includes a plurality of columns 254, 258, and 260 each for a category of parameters, and a plurality of rows 300 each for different parameter options within a particular category of parameters. Columns 254-260 are jointly referred to as columns 270. In one embodiment, as shown in FIG. 3B, column 254 is for a "vendor ID" category, column 258 is for "T1.413 revision number" category, and column 260 is for "vendor revision number" category. Other categories may be indicated using other columns 270. As shown in FIG. 3B, parameters 282-286 in column 254 each indicate a vendor known to DSLAM 30 that may have manufactured DSL chip 64 of device 18A. For example, parameter 282, which is shown as "0000000000000001", may identify Alcatel, Co, who is a DSL chip manufacturer that has provided communications settings that would result in optimal DSL connections for its DLS chips; however, some manufacturers identified in column 254 may not have provided settings to the manufacturer of DSLAM 30. Parameters 282-286 in column 258 each indicate a known version of ANSI T1.413 standard. For example, parameter 288, which shown as "001", identifies T1.413 Issue 2. Parameters 294-298 in column 260 each indicate a particular model identification of a model of product that may be produced by a known vendor. Each vendor identified in column 254 may produce multiple models of DSL chips. Thus, more than one vendor revision parameter may be associated with each vendor in column 254.

Although database 66 uses columns 270 for parameter categories and rows 300 for parameters, any suitable method of arranging data may be used for database 66. For example, rows 300 may be used for parameter categories and columns 270 may be used for parameters. Further, each row 300 may or may not correlate all the parameters in each row 300. For example, parameters 282, 288, and 294 in same row 300 are not necessarily correlated. However, in some embodiments, parameters 282, 288, and 292 may be correlated. Where parameters in at least some of rows 300 are correlated, some columns 270 may include multiple entries of same parameters. For example, if a vendor identified by parameter 282 makes two different types of DSL chips, then parameter 282 may be entered twice for each vendor revision number that would be entered in column 260.

Figure 4:
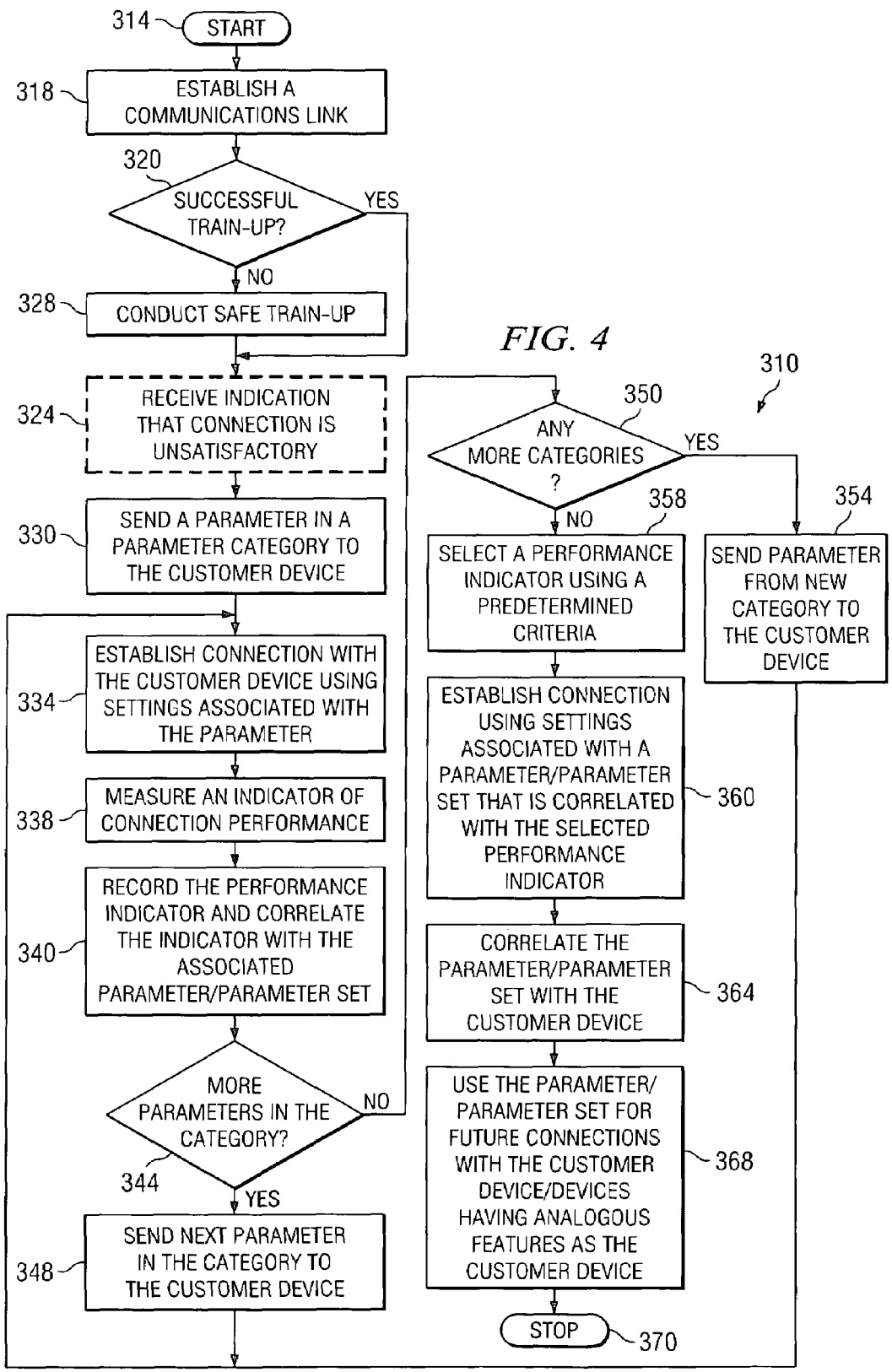
FIG. 4 is a block diagram illustrating one embodiment of a method for establishing a communications connection.

FIG. 4 is a block diagram illustrating one embodiment of a method 310 for establishing a communications connection, such as a DSL connection. Method 310 may be implemented using various devices, including program 62 and/or DSL chip 54 shown in FIG. 2. For illustrative purposes, one embodiment of method 310 is described below using features shown in FIGS. 2-3B; however, any suitable device may be used to implement some or all acts associated with method 310.

Method 310 starts at step 314. At step 318, line cards 36 of DSLAM 30 establishes a communications link with communications device 18A. At step 320, DSL chip 54 determines whether the train-up process with communications device 18A has been successful. If yes, then "yes" branch is followed to step 324. If no, then "no" branch is followed to step 328. At step 328, a safe train-up is conducted by DSL chip 54. In one embodiment, a set of parameters that may be used for the safe train-up procedure may include some or all of the following: A first parameter indicating that bit-swapping is disabled, a second parameter indicating that trellis coding is disabled, a third parameter indicating that full power mode is used (e.g. no power management is conducted), and/or a fourth parameter indicating that overhead framing mode three is supported; however, any other suitable parameter or parameter set that decreases the probability of train-up failure, as determined by one skilled in the art, may be used as a safe train-up parameter/parameter set. In one embodiment, as a part of the safe train-up procedure, parameters indicating an identification of a market-leading vendor and a well-known revision number of a released product may be used. In one embodiment, steps 320 and 328 may be omitted and method 310 may proceed directly from step 318 to step 324.

At step 324, DSLAM 30 may receive an indication that connection 26 is unsatisfactory. For example, this indication may be provided from a user of communications device 18A via a telephone call/email or may be generated automatically from device 18A. In another example, in one embodiment, DSLAM 30 may be used to determine, after a quality analysis of connection 26, that the quality is unsatisfactory using a predetermined criteria. Examples of predetermined criteria include signal-to-noise ratio ("SNR") and data transfer rate. In some embodiments, step 324 may be omitted.

At step 330, program 62 may direct DSL chip 54 to send a parameter in a parameter category to a customer-side device. For example, as shown in FIG. 3B, program 62 may direct DSL chip 54 to send parameter 282 in column 254 to device 18A. In one embodiment, parameter 282 may be sent in bit block 216 of message 200 shown in FIG. 3A. Although one parameter 282 is used as an example, other parameters in other categories may be sent with parameter 282 as a parameter set. In one embodiment, other parameters may be sent in their respective bits or bit blocks of message 200 shown in FIG. 3A. At step 334, DSL chip 54 may establish a connection with device 18A using settings that are associated with parameter 282. For example, communication settings associated with vendor identified by parameter 282 may include the following: A first setting indicating that a DSLAM having the particular DSL chips may limit the number of bins used in a training session or particular bins where known issues arise. A second setting indicating the use of trellis encoding A third setting indicating the use of overhead framing modes. A fourth setting indicating various applicable power levels.

Other settings may be associated with the parameter indicating a manufacturer of DSL chips. In some embodiments, more, less, or different types of settings may be associated with parameter 282. In one embodiment, the connection of step 334 may constitute a train-up session, and the parameters for forming the connection of step 334 may be sent using a C-MSGS1 message. For example, C-MSGS1 message may be used to send the parameters of step 330, step 348, or step 354. Steps 348 and 354 are described below.

At step 338, program 62 may measure an indicator of connection performance. Examples of such an indicator include SNR and data transfer rate; however, any other suitable indicators may be used as determined by one skilled in the art.

At step 340, program 62 may record the performance indicator measured at step 338 in memory 60 and correlate the indicator with parameter 282. At step 344, program 62 determines whether more parameters are in column 254 of database 66 shown in FIG. 3B. If yes, then "yes" branch is followed to step 348, where program 62 may direct DSL chip 54 to send next parameter 284 in column 254 to device 18A. In one embodiment, where parameter sets are sent to device 18A, the only difference between the two parameter sets sent respectively in steps 330 and 348 may be that the parameter set sent in step 348 includes parameter 284 instead of parameter 282. Referring again to step 344, if no more parameters are in column 254, then "no" branch is followed to step 350. At step 350, program 62 determines whether there are more categories remaining in database 66. If yes, then "yes" branch is followed to step 354, where program 62 may send a parameter, such as parameter 288, from a new category, such as a category indicated by column 258, to device 18A. In one embodiment, parameter 288 may be sent as a part of a parameter set. Then method 310 proceeds to step 334 where a new connection is established using a different parameter/parameter set. If no, then "no" branch is followed to step 358. In one embodiment, by using steps 334-354, a particular performance indicator may be correlated with every possible combination of available parameters, such as parameters 282 through 298.

At step 358, program 62 may select a recorded performance indicator using a predetermined criteria. An example of a predetermined criteria may be SNR, a data transfer rate, or some combination of these and other criteria. In one embodiment, a performance indicator that indicates the fastest data transfer rate while having the highest signal to noise ratio may be selected at step 358. In one embodiment, the predetermined criteria may include a SNR within a range of 0 db-9 db. In one embodiment, the predetermined criteria may include a SNR within a range of 3 db-6 db. In one embodiment, the predetermined criteria may include a SNR that is greater than 6 db. In one embodiment where a combination of data transfer rate and SNR is used as criteria, a recorded performance indicator that indicates the fast data transfer rate while having a minimum threshold SNR may be selected at step 358. For example, the selected performance may indicate the fast data transfer rate that has a SNR no lower than 6 db.

At step 360, connection 26 is established using the setting associated with one or more parameters that are selected at step 358. At step 364, communications device 18A is correlated with the one or more parameters that were used to establish DSL connection 26 at step 360. The correlation may be recorded at memory 80 through IOS 78. At step 368, the correlation recorded in memory 80 may be used for other connections with communications device 18A, so that it may not be necessary for program 62 to cycle through the available parameters again to determine the best parameter(s) for an optimal connection. In one embodiment, the selected parameter(s) that were used at step 360 may be correlated with a category of devices that device 18A falls under. For example, if device 18A is an ALCATEL SPEEDTOUCH PRO CPE, then all devices identified by the ALCATEL vendor identification may be correlated with the parameters used at step 360. Thus, DSLAM may use the same optimized parameters to establish a connection with any device identified by the ALCATEL vendor identification. Steps 364 and 368 may be omitted in some embodiments. Method 310 stops at step 370.

Although some embodiments of the present invention have been described in detail, it should be understood that various changes, substitutions, and alterations can be made hereto without departing from the spirit and scope of the invention as defined by the appended claims.

What is claimed is:

1. A method for establishing a communications connection, comprising:

providing a digital subscriber line access multiplexer having an integrated circuit chip, the integrated circuit chip operable to form a digital subscriber line connection with a communications device;

consecutively transmitting a plurality of parameters by the digital subscriber line access multiplexer to the communications device, each parameter correlated with at least one connection setting and identifying a particular party as a manufacturer of the integrated circuit chip, wherein consecutively transmitting a plurality of parameters comprises consecutively transmitting a plurality of parameters using a corresponding plurality of C-MSGS1 messages;

establishing a plurality of digital subscriber line connections each having a one-to-one correspondence with one of the plurality of parameters, wherein each connection is established in response to transmitting the connection's corresponding parameter using the at least one connection setting correlated with the corresponding parameter;

selecting one of the connections having a data transfer rate that is greater than a particular threshold;

identifying the parameter that corresponds to the selected connection; and initiating, by the digital subscriber line access multiplexer, an establishment of the digital subscriber line connection with the communications device using the at least one connection setting correlated with the identified parameter.

2. The method of claim 1, wherein the communications device is a first communications device belonging to a category, and the method further comprising:

correlating the identified parameter with the category;

terminating the digital subscriber line connection with the first communications device;

receiving a request to form a new digital subscriber line connection with a second communications device, the second communications device belonging to the category;

determining that the second communications device belongs to the category; and in response to the determination that the second communications device belongs to the category, establishing the new digital subscriber line connection with the second communications device using the at least one connection setting correlated with the identified parameter.

3. The method of claim 1, wherein selecting one of the connections comprises selecting one of the connections having a signal to noise ratio that is within predetermined range.

4. A method for establishing a communications connection, comprising:
provproviding a digital subscriber line access multiplexer having an integrated circuit chip, the integrated circuit chip operable to form a digital subscriber line connection with a communications device;
consecutively transmitting a plurality of parameter sets by the digital subscriber line access multiplexer to the communications device, each parameter set correlated with at least one connection setting and identifying a particular party as a manufacturer of the integrated circuit chip, wherein consecutively transmitting a plurality of parameter sets comprises consecutively transmitting a plurality of parameter sets using a corresponding plurality of C-MSGS1 messages;
establishing a plurality of digital subscriber line connections each having a one-to-one correspondence with one of the plurality of parameter sets, wherein each connection is established in response to transmitting the connection's corresponding parameter set using the at least one connection setting correlated with the corresponding parameter set;
selecting one of the connections having a data transfer rate that is greater than a particular threshold;
identifying the parameter set that corresponds to the selected connection;
initiating, by the digital subscriber line access multiplexer, an establishment of the digital subscriber line connection with the communications device using the at least one connection setting correlated with the identified parameter set; and
each parameter set identifies the particular party as a manufacturer of the integrated circuit chip and a particular version of ANSI T1.413 standard to which the integrated circuit chip complies.

5. A method for establishing a communications connection, comprising:
transmitting, by a digital subscriber line access multiplexer to a communications device, a plurality of parameters each representing a different indication of a same feature of the digital subscriber line access multiplexer and correlated with one or more communications settings, wherein each parameter is transmitted as a part of a particular C-MSGS1 message;
establishing a plurality of digital subscriber line connections with the communications device, each connection corresponding with a particular one of the parameters;
selecting one of the connections as meeting a predetermined criteria;
identifying the parameter that corresponds to the selected connection; and
establishing a digital subscriber line connection with the communications device using at least one communications setting correlated with the identified parameter.

6. The method of claim 5, wherein the same feature is a manufacturer of an integrated circuit chip in the digital subscriber line access multiplexer, the integrated circuit chip operable to establish the plurality of digital subscriber line connections.

7. The method of claim 5, wherein the same feature is a model identifier of an integrated circuit chip in the digital subscriber line access multiplexer, the integrated circuit chip operable to establish the plurality of digital subscriber line connections.

8. The method of claim 5, wherein the same feature is a particular version of ANSI T1.413 to which an integrated circuit chip in the digital subscriber line access multiplexer complies, the integrated circuit chip operable to establish the plurality of digital subscriber line connections.

9. The method of claim 5, wherein selecting one of the connections comprises selecting the connection having the fastest data transfer rate while having a signal to noise ratio no less than six decibels.

10. The method of claim 5, wherein selecting one of the connections comprises selecting one of the connections having a signal to noise ratio that is within a predetermined range.

11. The method of claim 5, wherein selecting one of the connections comprises selecting one of the connections having a data transfer rate that is equal to or greater than a minimum data transfer rate and a signal to noise ratio that is within zero to nine decibels.

12. The method of claim 5, and further comprising:
receiving an indication that a previously established digital subscriber line connection between the communications device and the digital subscriber line access multiplexer is unsatisfactory; and
wherein the plurality of parameters are transmitted in response to receiving the indication.

13. The method of claim 5, wherein transmitting a plurality of parameters comprises consecutively transmitting the plurality of parameters, each parameter transmitted after failing to establish a corresponding one of the connections.

14. The method of claim 5, wherein the communications device is a first communications device belonging to a category, and the method further comprising:
correlating the identified parameter with the category;
terminating the established digital subscriber line connection with the first communications device;
receiving a request to form a new digital subscriber line connection with a second communications device, the second communications device belonging to the category;
determining that the second communications device belongs to the category; and
in response to the determination that the second communications device belongs to the category, establishing the new digital subscriber line connection with the second communications device using the at least one communications setting correlated with the identified parameter.

15. The method of claim 5, further comprising:
failing to establish any digital subscriber line connection with the communications device using the plurality of parameters; and
establishing a safety digital subscriber line connection using a set of safety parameters, the set including a first parameter indicating that bit-swapping is disabled, a second parameter indicating that trellis coding is disabled, a third parameter indicating that no power management is conducted, and a fourth parameter indicating that overhead framing mode three is supported.

16. A system for establishing a communications connection, comprising:
a digital subscriber line access multiplexer having a processor and an integrated circuit chip operable to establish a digital subscriber line connection with a communication device; and
a program operable, when executed using the processor, to:
transmit a plurality of parameters to the communications device, each parameter representing a different indication of a same feature of the digital subscriber line access multiplexer and correlated with one or more communications settings, wherein each parameter is transmitted as a part of a particular C-MSGS1 message transmitted by the integrated circuit chip;

establish a plurality of digital subscriber line connections with the communications device through the integrated circuit chip, each connection corresponding with a particular one of the parameters;

select one of the connections as meeting a predetermined criteria;

identify the parameter that corresponds to the selected connection; and establish the digital subscriber line connection with the communications device using at least one communications setting correlated with the identified parameter.

17. The system of claim 16, wherein the same feature is a manufacturer of the integrated circuit chip.

18. The system of claim 16, wherein the same feature is a model identifier of the integrated circuit chip.

19. The system of claim 16, wherein the same feature is a particular version of ANSI T1.413 to which the integrated circuit chip complies.

20. The system of claim 16, wherein the program is operable to select the connection having the fastest data transfer rate as meeting the predetermined criteria.

21. The system of claim 16, wherein the program is operable to select the connection having the highest signal to noise ratio as being within a predetermined range.

22. The system of claim 16, wherein the program is operable to select one of the connections having a data transfer rate that is equal to or greater than a minimum data transfer rate and a signal to noise ratio that is within a predetermined range of one decibel to nine decibels.

23. The system of claim 16, wherein the program is further operable to:

receive an indication that a previously established digital subscriber line connection between the communications device and the digital subscriber line access multiplexer is unsatisfactory; and wherein the plurality of parameters are transmitted in response to receiving the indication.

24. The system of claim 16, wherein the program is operable to transmit a plurality of parameters by consecutively transmitting the plurality of parameters, each parameter transmitted after failing to establish a corresponding one of the connections.

25. The system of claim 16, wherein the communications device is a first communications device belonging to a category, and the program is further operable to:

initiate a correlation of the identified parameter with the category;

terminate the established digital subscriber line connection with the first communications device;

receive a request to form a new digital subscriber line connection with a second communications device, the second communications device belonging to the category;

determine that the second communications device belongs to the category; and in response to the determination that the second communications device belongs to the category, initiate an establishment of the new digital subscriber line connection with the second communications device using the at least one communications setting correlated with the identified parameter.

26. The system of claim 16, wherein the program is further operable to:

determine that the integrated circuit chip failed to establish any digital subscriber line connection with the communications device;

initiate an establishment of a safety digital subscriber line connection using a set of safety parameters, the set including only a first parameter indicating that bit-swapping is disabled, a second parameter indicating that trellis coding is disabled, a third parameter indicating that no power management is conducted, and a fourth parameter indicating that overhead framing mode three is supported.

27. The system of claim 16, wherein the program is implemented as a part of the integrated circuit chip.

28. A system for establishing a communications connection, comprising:

means for communicating with a communications device over a digital subscriber line connection; and means for transmitting a plurality of parameters to the communications device, each parameter representing a different indication of a same feature of a digital subscriber line access multiplexer and correlated with one or more communications settings, wherein each parameter is transmitted as a part of a particular C-MSGS1 message, establishing a plurality of digital subscriber line connections with the communications device through the integrated circuit chip, each connection corresponding with a particular one of the parameters, selecting one of the connections as meeting a predetermined criteria, identifying the parameter that corresponds to the selected connection, and establishing the digital subscriber line connection with the communications device using at least one communications setting correlated with the identified parameter.

29. A method for establishing a communications connection, comprising:

transmitting, by a digital subscriber line access multiplexer to a communications device, a plurality of parameters each representing a different indication of a same feature of the digital subscriber line access multiplexer and correlated with one or more communications settings;

establishing a plurality of digital subscriber line connections with the communications device, each connection corresponding with a particular one of the parameters;

selecting one of the connections as meeting a predetermined criteria;

identifying the parameter that corresponds to the selected connection;

establishing a digital subscriber line connection with the communications device using at least one communications setting correlated with the identified parameter;

failing to establish any digital subscriber line connection with the communications device using the plurality of parameters; and establishing a safety digital subscriber line connection using a set of safety parameters, the set including a first parameter indicating that bit-swapping is disabled, a second parameter indicating that trellis coding is disabled, a third parameter indicating that no power management is conducted, and a fourth parameter indicating that overhead framing mode three is supported.

30. A system for establishing a communications connection, comprising:
- a digital subscriber line access multiplexer having a processor and an integrated circuit chip operable to establish a digital subscriber line connection with a communication device; and
- a program operable, when executed using the processor, to:
    - transmit a plurality of parameters to the communications device, each parameter representing a different indication of a same feature of the digital subscriber line access multiplexer and correlated with one or more communications settings;
    - establish a plurality of digital subscriber line connections with the communications device through the integrated circuit chip, each connection corresponding with a particular one of the parameters;
    - select one of the connections as meeting a predetermined criteria;
    - identify the parameter that corresponds to the selected connection;
    - establish the digital subscriber line connection with the communications device using at least one communications setting correlated with the identified parameter;
    - determine that the integrated circuit chip failed to establish any digital subscriber line connection with the communications device;
    - initiate an establishment of a safety digital subscriber line connection using a set of safety parameters, the set including only a first parameter indicating that bit-swapping is disabled, a second parameter indicating that trellis coding is disabled, a third parameter indicating that no power management is conducted, and a fourth parameter indicating that overhead framing mode three is supported.

* * * * *